US009870679B2

(12) United States Patent
Kleihorst et al.

(10) Patent No.: US 9,870,679 B2
(45) Date of Patent: Jan. 16, 2018

(54) MONITORING SYSTEM USING COLOR CODING

(71) Applicant: SENSO2ME BVBA, Kasterlee (BE)

(72) Inventors: Richard Petrus Kleihorst, Kasterlee (BE); Alain Myriam Robert Van Buyten, Knokke-Heist (BE); Johannes Bernardus Schueler, Veldhoven (NL); Wilfried Richard Hortense Philips, Lebbeke (BE); Stefan Albert Denise Debois, Edegem (BE)

(73) Assignee: SENSO2ME BVBA, Kasterlee (BE)

( * ) Notice: Subject to any disclaimer, the term of this patent is extended or adjusted under 35 U.S.C. 154(b) by 76 days.

(21) Appl. No.: 14/876,900

(22) Filed: Oct. 7, 2015

(65) Prior Publication Data
US 2017/0103625 A1    Apr. 13, 2017

(51) Int. Cl.
G08B 5/36 (2006.01)
H04B 5/00 (2006.01)
G08B 21/04 (2006.01)
G08B 25/00 (2006.01)
G08B 25/12 (2006.01)

(52) U.S. Cl.
CPC ........... *G08B 5/36* (2013.01); *G08B 21/0469* (2013.01); *H04B 5/0056* (2013.01); *G08B 25/007* (2013.01); *G08B 25/12* (2013.01)

(58) Field of Classification Search
CPC ...... G08B 5/36; G08B 21/0469; G08B 21/02; G08B 21/0202; G08B 21/22; G08B 21/0288; G08B 21/0446; H04B 5/0056; A61B 5/0002; G06F 19/3418

USPC ........................................................ 340/573.1
See application file for complete search history.

(56) References Cited

U.S. PATENT DOCUMENTS

| 7,660,263 B1 | 2/2010 | Pfister et al. |
| 8,868,616 B1 | 10/2014 | Otto et al. |
| 2005/0264416 A1* | 12/2005 | Maurer ............... G06Q 10/08 340/539.13 |
| 2006/0203747 A1 | 9/2006 | Wright et al. |
| 2008/0001735 A1 | 1/2008 | Tran |
| 2008/0269932 A1 | 10/2008 | Chardon et al. |

(Continued)

FOREIGN PATENT DOCUMENTS

| EP | 0 063 878 A1 | 11/1982 |
| EP | 0 149 982 A2 | 7/1985 |

(Continued)

*Primary Examiner* — Omer S Khan
(74) *Attorney, Agent, or Firm* — Workman Nydegger

(57) ABSTRACT

A system for monitoring a person in a building having multiple rooms. The system comprises a wireless sensor system for detecting and collecting movements of the person. The wireless system comprises: a data collecting device with an RF receiver; a plurality of wireless signaling devices with an RF transmitter, an adjustable room setting, a multi-color light source, and a push button; and a computing device with analysis software, and communication means for transmitting analysis date to viewing devices having a color display. When the button is pushed, a specific color is shown, the color is linked to the room-type and is set during configuration. The same color is used in the viewing devices. This allows easy and intuitive configuration, and easy and intuitive interpretation of the analysis data.

20 Claims, 6 Drawing Sheets

(56) References Cited

U.S. PATENT DOCUMENTS

| | | |
|---|---|---|
| 2009/0009323 A1 | 1/2009 | Weaver et al. |
| 2010/0026686 A1 | 2/2010 | Koo et al. |
| 2010/0064596 A1* | 3/2010 | Bowsher .............. G06T 15/00 52/29 |
| 2012/0035427 A1 | 2/2012 | Friedman et al. |
| 2012/0326834 A1* | 12/2012 | Kennedy .......... H04M 1/72519 340/3.1 |
| 2013/0214923 A1 | 8/2013 | Sheridan |
| 2013/0343360 A1 | 12/2013 | Poovendran et al. |
| 2014/0280921 A1 | 9/2014 | Vanderkoy et al. |
| 2014/0335490 A1 | 11/2014 | Baarman et al. |
| 2015/0035670 A1 | 2/2015 | Cyr et al. |
| 2016/0285416 A1* | 9/2016 | Tiwari .................. H02S 50/15 |

FOREIGN PATENT DOCUMENTS

| | | |
|---|---|---|
| EP | 2 472 487 A2 | 7/2012 |
| WO | 2004/032427 A1 | 4/2004 |
| WO | 2007/018806 A1 | 2/2007 |

* cited by examiner

MONITORING SYSTEM USING COLOR CODING

FIELD OF THE INVENTION

The invention relates in general to the field of systems and devices for monitoring a person living and/or moving in a building comprising a plurality of locations, e.g. rooms. The present invention relates in particular to a presence monitoring system and/or a mobility monitoring system, and to a wireless signaling device used in such a system.

BACKGROUND OF THE INVENTION

Monitoring systems for monitoring a person, e.g. an elderly person living alone at home, are known in the art. Such a system is for example described in EP2472487.

EP2472487 describes a remote monitoring system for monitoring elderly people, children, etc. in a home-like facility. The system collects information on the monitored object's condition and health, and detects changes thereof over time using sensors and data collecting means, and analyses the collected data. However, EP2472487 does not provide details of how to install or configure such a system.

SUMMARY OF THE INVENTION

It is an object of embodiments of the present invention to provide a good system for monitoring a person and/or a good monitoring system using same and/or a good wireless signaling device for use in such a system.

It is an object of embodiments of the present invention to provide a system for monitoring a person and/or a monitoring system using same and/or a wireless signaling device for use in such a system, which system is easier (e.g. more intuitive) to install and/or configure and/or reconfigure.

It is an object of embodiments of the present invention to provide a system for monitoring a person and/or a monitoring system using same and/or a wireless signaling device for use in such a system, which system is easier (e.g. more intuitive) to extend (for example by adding one or more wireless signaling devices some time after using the original system with a certain number of signaling devices).

It is an object of embodiments of the present invention to provide a system for monitoring a person and/or a monitoring system using same and/or a wireless signaling device for use in such a system, allowing an easier (e.g. more intuitive) interpretation of analyzed data.

These and other objectives are accomplished by a device according to embodiments of the present invention.

In a first aspect, the present invention relates to a system suitable for monitoring a person moving in a building comprising a plurality of rooms, the system comprising: i) a wireless sensor system for detecting and collecting movements of the person in at least some of the plurality of rooms, the wireless system comprising a data collecting device and one or more wireless signaling devices, the data collecting device comprising an RF receiver for receiving movement related data from each of the plurality of wireless signaling devices, and a programmable controller connected to a memory, the controller being adapted for storing the received data at least temporarily in the memory, and communication or networking means for transmitting the processed data; the one or more wireless signaling device comprising at least one movement sensor for detecting movement events in a particular room, a programmable micro-controller and an RF transmitter for processing and transmitting such movement events to the data collecting device; ii) a computing device comprising analysis software for analyzing the detected movement events and for determining at least a present location value indicative of the room the person being monitored is present, the computing device being connectable to or connected to wired or wireless communication or networking means for sending the present location value to at least one viewing device, the at least one viewing device comprising communication means for receiving the present location value, and comprising a color display and a viewing application for showing the present location corresponding to the present location value; wherein: iii) the one or more wireless signaling device further comprises an adjustable room-type setting corresponding to a type of room where the wireless signaling device is to be located, and a multi-color light source, and a push-button, the micro-controller being adapted to, when the push-button is pressed, drive the multi-color light source to show light of a particular color based on the room-type defined by the room-type setting and based on a predefined color scheme; the micro-controller being further adapted for sending at least one data packet after detection of a movement event by its movement sensor, the data packet comprising room-type data corresponding to the room-type setting, and iv) the analysis software is adapted for analyzing the movement events taking into account the room-type data; v) the viewing application being adapted for displaying the present location by using at least one color object having a color based on said room-type setting and based on the predefined color scheme.

It is an advantage that the room-type is adjustable by an end-user, after the production phase, because it allows to produce only generic devices (having a default room-type), which can be customized by the end-user or by (re)seller(s), e.g. by using particular software means. This offers huge advantages during production and logistics, as opposed to for example the production of wireless signaling devices having a different color housing, with a different color for each room-type (e.g. 1=bathroom, 2=kitchen, etc).

It is an advantage that the room-type is adjustable, and is represented to the user by a color, rather than for example by a text message on an LCD display, or represented by a sound wave rendered by a loudspeaker, or by a series of numbers printed on a barcode, or not rendered at all, and that this color is rendered by a light source, because this technique allows "the color of the device" to be set and/or modified by software, after production, in contrast to for example a housing made of a specific color.

It is an advantage that a value related to the room-type is stored in each of the sensor devices, and is sent along with the data packets sent by the sensor devices, rather than making the association of a particular device and a particular room at system-level (for example in a server), because the former technique allows the user to simply configure the device itself, while the latter requires complex system configuration where for example long device-addresses (e.g. 48 bits MAC addresses) are to be inputted (e.g. read from a sticker and typed on a keyboard) in some web-interface, and then this long address is to be associated to a particular room-type.

It is an advantage that the room-type is "shown" to the user, so that he/she has visual feedback that he correctly configured the device. It is an advantage that the color chosen for each room-type corresponds to a predefined color scheme, which can be chosen to be highly intuitive (e.g.

blue=bathroom, green=garden, etc.), because this makes the installation of the devices in the network very simple and intuitive.

It is an advantage that the at least one viewing device (e.g. a PC or a smartphone of a relative) has a color display, and has a viewing application that uses the same predefined color scheme, e.g. when displaying the "present location" (i.e. when the person is in the bathroom, the "blue" color is shown on the viewing device), or when displaying other information related to a particular room, (e.g. the time spent in the bathroom may be indicated in blue). This allows easy and intuitive interpretation, without requiring a long learning-curve.

It is an advantage that the system can be easily installed and configured by the end-user him/her-self, and does not require a professional installer, inter alia because the wireless signaling devices need not be mounted to a wall, but can simply be put on a table or the like.

It is an advantage that the light source of a particular wireless signaling device shows the room-type when the button is pushed, because it allows to verify whether a particular device is located in the correct room (which may be important to some parts or modules of the analysis software, e.g. the module that calculates sleep-related values will look primarily at bedroom-related data). Showing the color when the button is pushed allows to verify which device belongs to which room (e.g. allows to detect if a cleaning person inadvertently swapped two wireless signaling devices). This may be important as a means of troubleshooting installation problems, and may be especially useful for poor-sighted people incapable of reading fine print on the small devices.

The predefined color scheme may for example be based on a color look-up table (CLUT), allowing an index-value (e.g. a 3 bit value or a 4-bit value) to be converted into for example a 24-bit value representing 8 bits for Red, 8 bits for Green, and 8 bits for Blue component values, together forming a single predefined color. In this way the configurable setting can be drastically reduced.

In this case, the wireless signaling device and the viewing device would use the same color lookup-table if both devices have the same color depth, or substantially the same color lookup-table (for example, if the color light is driven by 3×8-bit PWM-values, and the color display would for example have a smaller color depth, such as 6+6+6 bits.

The wireless signaling device may comprise at least two or at least three movement sensors, oriented in different directions.

The processor of the data collecting device may perform basic processing of the received data such as for example: extracting the payload information, removing the checksum, time-stamping the data packet before storage in the memory, removing duplicate messages, discarding data packets from another network, etc.

The communication or networking means may comprise a connector or a port to an external communication device, such as e.g. a modem, or may comprise the communication device itself.

In an embodiment, the multi-color light source is an RGB-LED.

The micro-controller may be adapted to send three PWM-signals to the RGB-LED, corresponding to the specific color (e.g. 24 bit RGB values) of the predefined color scheme that corresponds to the selected room-type (e.g. a 4-bit value or a 6-bit-value). Using PWM-signals is a very convenient way to generate any arbitrary color (e.g. a color having a Red component value, a Green component value and a Blue component value, each in the range of 0 to 255).

It is an advantage if the micro-processor has three PWM hardware-blocks for generating these PWM-signals (hence the generation does not require substantial processing power), but alternatively, three PWM-signals may also be generated in software, using timers and/or counters.

Using an RGB-LED offers the advantage that it consumes only a very small amount of power when being activated, hence helping to ensure long battery life, which is particularly relevant if the device is battery powered by a non-rechargeable and non-replaceable battery.

In an embodiment, a value of the adjustable room-type setting is defined by a plurality of dip-switches.

The room-type may be coded for example with 3 bits (indicating 1 out of 8 different room types), or 4 bits (indicating 1 out of 16 different room types), or more than 4 bits, and the value of each bit (zero or one) may be represented by a position of one of three or four (or more) dip switches.

The dip-switches may be used in conjunction with one or more resistors, and may be configured for providing one or more digital or analog values to the micro-controller via one or more pins thereof, for example by pulling-up or pulling down a number of GPIO-pins, or by forming a ladder-resistor network for generating a particular analog value which can be read via an A/D converter of the micro-controller and converted into a multi-bit value, or in any other way.

It is an advantage of using dip-switches that they occupy only a relatively small area on a PCB (typically in the order of 1 cm2), and that they can be relatively easily set in a particular position. In case dip switches are used, the housing of the wireless signaling device typically comprises a removable cover, for easy accessibility. It is an advantage of using dip switches over other techniques (such as e.g. an infrared receiver port, or an NFC receiver circuit, or the like) that no second device with an infrared transmitter or an NFC transmitter and configuration software is required.

In an embodiment, a value of the adjustable room-type setting is defined by a plurality of bits in a non-volatile memory, and the micro-processor of the wireless signaling device is adapted for reading said non-volatile memory when the button is pressed and for driving the multi-color light source to show a particular color based on said value and based on the predefined color scheme.

The predefined color scheme may be a color-lookup table (CLUT), and the plurality of bits may form a digital value representing the room-type, and be used as an index in the color look-up table.

In an embodiment, the wireless signaling device further comprises an NFC circuit configured for writing said non-volatile memory using an external NFC writer, and the micro-processor of the wireless signaling device is adapted for reading said non-volatile memory when the button is pressed and/or held down for a predetermined time-period.

In an embodiment of the system, the data collecting device further comprises an NFC writer and corresponding software for writing a particular value to the non-volatile memory of the wireless signaling devices, so that the end-user can configure the wireless signaling devices by holding them in close vicinity to the data collecting device for configuring them. But other devices having an NFC writer may also be used, such as for example a smart-phone with NFC writer capabilities and with an appropriate app. The use of configuration via NFC and an app is very convenient, especially for non-technical or not-so technical people.

It is an advantage of using a Near Field Communication circuit (NFC) and a non-volatile memory, that it allows the adjustable setting to be programmed (or updated) without making physical contact with the wireless signaling device.

This allows that the housing of the wireless signaling device can be substantially closed, e.g. water tight. This in turn offers the advantage that the risk of damaging the device by spilling water or the like, is reduced or even completely eliminated.

It is an advantage of using a Near Field Communication circuit (NFC) and a non-volatile memory, that it allows the non-volatile memory to be erased and/or written without using power from a local battery (when present), thus the lifetime of such local battery is not negatively influenced by the initial configuration of the device when setting the room-type.

The non-volatile memory may be a dual-port EEPROM accessible on the one hand by a processor embedded in the NFC circuit, and on the other hand by the micro-processor of the wireless signaling device.

In an embodiment, the micro-processor is further adapted for testing whether the button is pressed and released according to a predefined pattern, and if the outcome of the test is true, to adjust the value of the room-type in the non-volatile memory, and to store the adjusted value in the non-volatile memory.

The predefined pattern may for example be that the button is held down for a first predefined time period, is subsequently released for a second predefined time period, is subsequently held down again during a third predefined time period, and then released again for at least a fourth predefined time period. There may a relatively large tolerance margin for each time period, for example +/−0.75 seconds.

It is an advantage of using a predefined pattern with at least two time-windows in which the button is to be pressed and at least one intermediate time-window where the button is to be released. This reduces the risk of inadvertently adjusting the room-type when the user simply wanted to check the color of a particular device.

It is an advantage of allowing a button-pattern for configuring the room-type, because in such embodiments an IR receiver or NFC receiver or the like can be omitted, and no second devices having an IR transmitter or NFC transmitter or the like are required.

The room-type may for example be incremented when the predefined pattern is used, or decremented when the predefined pattern is used. In another embodiment, specific predefined patterns may be used to directly set a particular room-type.

In yet another embodiment, the predefined pattern could start a configuration routine, where the micro-processor resets the room-type, then starts a loop in which the value of the room-type is incremented by one, and the corresponding color is shown for a predefined time period (e.g. about 1 sec), until the user presses the button to select the color and room-type last shown.

In yet another embodiment, the color is selected in a two-step process. Assuming the color is represented by six bits. In a first step, eight color combinations could be shown, corresponding to combinations wherein (R='00' or R='11') and (G='00' or G='11') and (B='00' or B='11'), and the user has to choose one out of eight colors which is "closest" to his preference. In a second step, eight variations of the color selected in the first step are chosen, whereby (R='00' or R='01' in case a color with R='00 was chosen in step 1, and (R='10' or R='11 in case a color with R='11' was chosen in step 1), and likewise for the Green and Blue color components. In this way, the user has select one of 8 colors, twice, which may be much more convenient than choosing one out of 64 colors, once.

In an embodiment, the room-type value is represented by a predefined number of at least three bits, each representing a most-significant bit of a color component of the particular color corresponding to said room-type value.

It is an advantage of embodiments wherein the values of the particular color corresponding to a particular room-type value can be derived directly and solely from the room-type value without the need for an additional lookup-table (CLUT). For example, if the room-type is represented by 3 bits, each of these bits would represent the MSB (most significant bit) of a Red, Green and Blue color component respectively. For example, room-type='011' could correspond to color (Red, Green, Blue)=(0x00, 0x80, 0x80), where 0x represents hexadecimal notation. The use of 3 bits allows 8 different room types to be differentiated, and to be represented by 8 different colors. In this example, the 7 remaining bits are chosen to be all zeros, but that is not absolutely required, and another value for these bits could also be chosen, for example, if the lower 7 bits would be chosen equal to '1000000', the corresponding color would be (0x40, 0xC0, 0xC0). Of course, the viewing device and the wireless signaling device would use the same value for the lower bits, in order to avoid confusion.

In a specific embodiment the room-type is represented by at least 6 bits, being 3 sets of 2 bits, and each set of two bits would represent the two most significant bits of a Red, Green and Blue color component. For example, if room-type='101101', the corresponding color would be (Red, Green, Blue)=(0x80, 0xC0, 0x40) if the lower 6 bits are chosen as all zeros, or for example (0xA0, 0xE0, 0x60) if the lower 6 bits are chosen equal to '100000', but other values for the lower bits may also be used.

In an embodiment, the at least one movement sensor is at least one passive infrared (PIR) sensor.

In an embodiment, the wireless monitoring device has a single PIR sensor, but in other embodiments two or more PIR sensors oriented in different directions may also be used. Using a PIR sensor rather than e.g. a digital image camera and/or a microphone offers the advantage that privacy of the person being monitored is better respected, and that only movements of said person in one or more rooms, is captured. Using a PIR sensor also offers the advantage that the information provided is binary (either there is movement, or there is not), hence only very small quantities of data need to be transmitted (in contrast to for example audio or video data). Moreover, the "sample-rate" can be very low, for example, detecting whether there was movement or not with a time-resolution in the range of 0.25 s to 2.0 s, for example one sample every second may be quite sufficient for the envisioned applications.

In an embodiment, the at least one movement sensor is a movement sensor selected from the group consisting of: an inductive movement sensor, a capacitive movement sensor, an acoustic based movement sensor, a vibration based movement sensor, or an EMI/EMC based movement sensor.

In an embodiment, the data collecting device further comprises a real-time clock, and wherein receiving and storing the data packets by the data collecting device comprises: obtaining a time value from said real-time clock when a data packet is received by the RF receiver, and adding a time-stamp to at least some of the received data packets, based on the time value obtained from said real-time clock, and storing the time stamped data packets in the memory.

By providing a data collection device with areal-time clock, no real-time clock is required in the wireless signaling devices, hence reducing the system cost. In addition, synchronization errors of a plurality of individual real-time clocks (one in each wireless signaling device) can be avoided.

It is an advantage of time-stamping received data packets (at least the data packets related to movement events), because this allows movement events to be stored in a file (e.g. in the memory of the data collector, or in a database), which file may be later transmitted to a server, while still being able afterwards to determine when the movement events occurred.

Based on the time-stamped movement data, an analysis software can determine for each moment of the day where the person actually was, and can extract mobility information, for example by calculating how much time was required for moving from one room to another. The analysis software may also compare and/or average the time to move from a particular room to another particular room at different moments in time, for example on a weekly or monthly or yearly basis, in order to detect mobility changes of the person being monitored. Or the analysis software may compare the time required to move from a particular room to another in the morning, in the afternoon and in the evening. This allows to detect problems, e.g. physical problems or mental problems long before they become problematic.

In an embodiment, each of the wireless signaling devices further comprises a unique identifier (ID) stored in a non-volatile memory to allow each of the wireless signaling devices to be differentiated, and wherein the data packets sent by each wireless signaling device further comprises said identifier, and wherein the data collecting device holds a list of unique identifiers corresponding to the particular data collecting device, and wherein the processor of the data collecting device has a filter function for ignoring data packets with identifiers not included in the list.

Using a unique identifier for each wireless signaling device allows the data collecting device to select only data packets related to the particular facility, and to ignore for example data packets coming from a neighboring facility or apartment. It also allows the analysis software to identity exactly which of the wireless signaling devices transmitted which data packet, and for example when the data packets also include other information, such as low battery status, this device can be uniquely defined, and the owner can be warned before the battery is completely drained. The list of unique identifiers maintained in the data collecting device can be set-up in any known manner, for example by a "pairing" technique, in which case both devices (the data collecting device and the wireless signaling device are set in a "pairing mode", and the signaling device sends its unique identifier to the data collecting device, and the data collecting device receives and stores this unique identifier). Such techniques are well known in the field of mobile phones, and hence need not be further explained here.

The non-volatile memory where the unique identifier is stored may be the same non-volatile memory as where the adjustable room-type setting is stored (in case the room-type is represented by bits in a memory), or may be another memory (e.g. a flash device where program-code is stored).

In an embodiment, the wireless signaling device further comprises a light sensor, and the micro-processor of the wireless signaling device is further adapted for reading a light intensity value from said light sensor and for including data corresponding to said light intensity value in at least some of the data packets transmitted to the data collecting device.

The value read from the light sensor may be an analog value, which may be digitized by means of an A/D converter of the micro-processor, which digital value can then be added to a data-packet as such, or after scaling or the like. Or the value may be compared to a threshold, and the outcome of the comparison, e.g. a single bit indicating whether it is "dark or not", could be transmitted.

It is an advantage of using wireless signaling devices having a light sensor, for example a visible light detector or daylight sensor or the like, because it allows the monitoring system to detect for example whether a light is turned on during the night in a particular room. This allows for example to determine whether or not a person goes to the bathroom during the night, with the lights switched on or off, again without violating his/her privacy.

In an embodiment, the wireless signaling device further comprises a temperature sensor, and the micro-processor of the wireless signaling device is adapted for reading a temperature value from said temperature sensor and for including data related to said temperature value in at least some of the data packets transmitted to the data collecting device.

It is an advantage of using wireless signaling devices having a temperature sensor, because it allows to monitor the temperature in one or more rooms. The temperature value can be used for example by the analysis software or by a person receiving the analyzed data on his/her viewing device, to interpret some behavior of the person being monitored (for example to explain bad sleep because it was too warm in the bedroom).

In an embodiment, the wireless signaling device further comprises a housing containing a printed circuit board (PCB) holding at least the micro-controller, the RF transmitter, the movement sensor and the button and optionally also the light source, and optionally also the temperature sensor.

In an embodiment, e.g. having NFC and a non-volatile memory, the housing may be a substantially closed housing, for example a water-tight housing. In another embodiment, e.g. having dip switches and/or a replaceable battery, the housing may have a removable lid.

In an embodiment, the housing of the wireless signaling device comprises a non-replaceable battery, and wherein the housing is permanently closed.

It is an advantage of using a permanently closed housing, e.g. a water-tight housing, that the risk of malfunction due to physically touching any of the components (ESD damage), or due to spillage of a liquid (such as e.g. water or coffee) on the device is minimized.

In an embodiment, the battery may be a rechargeable, and the housing may comprise further circuitry for charging said battery in a contact-less manner, e.g. based on capacitive coupling or via a connector and an external adapter.

In a preferred embodiment, the battery is non-rechargeable. It is an advantage of using a non-rechargeable battery that no circuitry needs to be foreseen for charging and/or recharging the battery, which is beneficial in terms of PCB area and component cost and manufacturing cost.

In an embodiment, the PCB is mounted in a pivotable manner, and wherein the movement detector is mounted on a front side of the PCB and protrudes the housing, and wherein the button is mounted on a back side of the PCB facing a portion of the housing, and the wireless signaling device further comprises a spring arranged such that, when a force is exerted upon the movement detector, the button is pressed, and when no force is exerted upon the movement detector, the button is not pressed.

The spring may be embedded in the button, or may be a discrete spring element.

In a second aspect, the present invention relates to a mobility monitoring system for determining mobility and/or mobility changes of a person living in a residential facility, comprising a wireless sensor system according to the first aspect, wherein the analysis software is configured for calculating one or more mobility values based on a time difference between a last movement detected by a first wireless signaling device, and a first movement detected by a second wireless signaling device different from the first wireless signaling device.

The one or more mobility values may be communicated to the viewing devices, e.g. mobile viewing devices such as e.g. a smart-phone of a relative or a care taker.

The analysis software (also referred to as "data analysis program") is based on the assumption that each wireless signaling device with a movement sensor is associated with a particular room-type.

Data analysis programs per se are known in the art, but one of the underlying principles of the present invention is that the time a person needs to move from one room (e.g. the living room) to another room (e.g. the bedroom) is accurately determined. By calculating values of this time over a prolonged period of time (e.g. several weeks or several months or even several years), mobility changes can be detected and reported.

It is a particular advantage of the present invention that a mobility value (or variation over time) can be determined without violating the privacy of the person. It is another advantage that the mobility can be measured with high accuracy (for example with a time-resolution of about 1.0 second), which is made possible inter alia because the data packets are time-stamped by the data collection device.

The analysis software can for example calculate and provide an array of 12 mobility values, each value representing an average time to move from one particular room to another particular room, e.g. value1=the average time to move from the living room to the bedroom, value2=the average time to move from the kitchen to the living room, etc. Of course the analysis program needs to apply data filtering to filter out for example data when the person did not move directly from the living room to the bedroom, but such algorithms are known in the art, and is not the main focus of the present invention.

It is an advantage of embodiments where mobility values are determined and communicated to the mobile devices that the holder of the mobile device (for example a relative or care-taker) can not only see the present location of the person being monitored, but can also see mobility changes (over time), e.g. mobility improvement of a person recovering from an injury, or mobility degradation of an elderly person.

In an embodiment, the computing device comprising the analysis software is the programmable controller of the data collecting device, and the data collection device further comprises a database for at least temporarily storing the collected data packets; and the communication means is connectable to and/or comprises a wired or wireless transceiver for directly or indirectly communicating the present location information and/or the one or more mobility values to the at least one viewing device.

In this embodiment, the processor of the data collection device stores the data packets in a local database preferably implemented in a non-volatile memory such as flash memory, and performs the analysis of the collected data itself, without the need for an external server. The data collecting device then communicates to the one or more mobile devices (e.g. smart phones, tablets, etc) directly or indirectly, using for example wireless communication means such as a WiFi, GRPS, GSM, UMTS or EDGE communication, etc, or using wired communication means such as e.g. ethernet, ADSL, etc., or combinations of several of these, or using any other type of connection.

In an embodiment, the mobility monitoring further comprises a network server operatively connected to the data collecting device; and the data collecting device is further adapted to transfer at least a subset of the data packets received from the wireless signaling devices to the network server; and the network server comprises a computing unit being the computing device comprising the analysis software, the network server further comprising a database for at least temporarily storing the data packets; and the communication means is connectable to and/or comprises a wired or wireless transceiver for directly or indirectly communicating the present location information and/or the one or more mobility values to the at least one viewing device.

In this embodiment, the data collection device does not extract mobility information itself, but leaves the analysis to a network server. This has the advantage that a more complex analysis algorithm may be used which can be shared by multiple home networks, and that the cost and the load of the processor of the data collecting devices can be reduced (less powerful processor and/or less memory needed), thus reducing the system cost.

The operative connection between the data collecting device and the network server may comprise a wired connection (e.g. via ethernet or coax cable), or wireless connection (e.g. via WiFi or GPRS or GSM), or modem connection (e.g. via ADSL modem), or any other type of connection.

The viewing device, e.g. mobile viewing device may for example be a smart-phone of a family member, a relative or a nurse, etc.

The server communicates to the one or more mobile devices (e.g. smart phones, tablets, etc) directly or indirectly, using for example wireless communication means such as a WiFi, GRPS, GSM, UMTS or EDGE communication, etc, or using wired communication means such as e.g. ethernet, ADSL, etc., or combinations of several of these, or using any other type of connection.

In a third aspect, the present invention relates to a wireless signaling device for use in the system of the first and/or the second aspect, the wireless signaling device comprising: a movement sensor for detecting movement events in a particular room where the wireless signaling device is physically located; a programmable micro-controller and an RF transmitter for sending a data packet to a data collecting device for signaling the movement event; adjustable room-type-related setting corresponding to a type of room where the wireless signaling device is to be located; a multi-color light source, and a push-button, wherein: the micro-controller is adapted to, when the button is pressed, drive the multi-color light source to show light of a particular color based on the room-type defined by the settings and based on a predefined color scheme; and the micro-controller of the wireless signaling device is further adapted for sending at least one data packet after detection of a movement event by its movement sensor, the data packet comprising data related to the room-type defined by the settings.

Particular and preferred aspects of the invention are set out in the accompanying independent and dependent claims.

Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
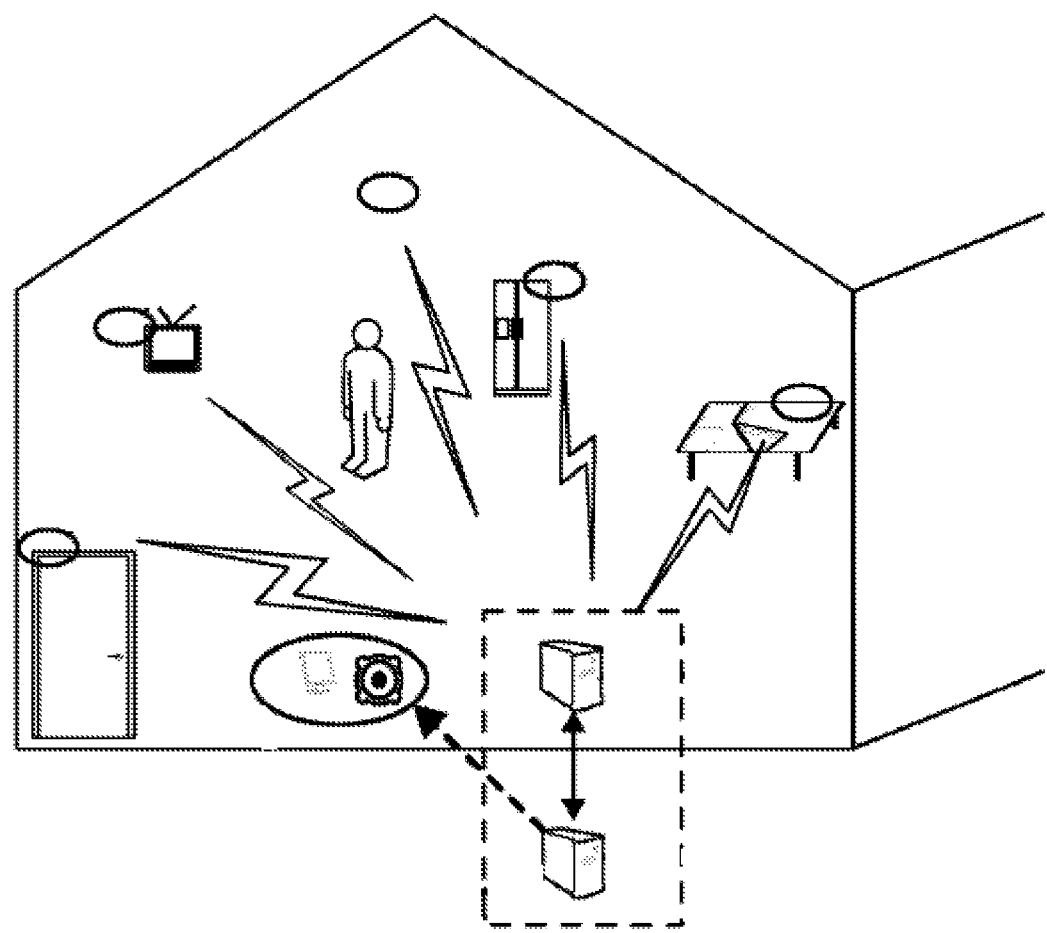
FIG. 1 shows a schematic diagram of a system for monitoring a person living in a residential facility, known in the art.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in the present invention reference is made to "movement sensor", what is meant is a sensor capable of detecting whether a person moves relative to the sensor, the sensor being stationary in the building.

The present invention is situated in the field of systems for monitoring a person in a building having multiple rooms, e.g. an elderly person living alone at home or an elderly person living with a companion while the companion is temporarily out of the house (e.g. shopping). The system comprises a wireless sensor system for detecting and collecting movement information and/or presence information of the person. As will be explained further in more detail, the wireless system comprises (inter alia) a data collecting device with an RF receiver; a plurality of wireless signaling devices with an RF transmitter, and a computing device (which may be e.g. the data collecting device itself or a network server) with analysis software for analyzing the movement data and/or presence data. Results of the analysis (e.g. the present location of the person, and/or mobility changes of the person) can be communicated to one or more viewing devices having a color display, for example a smart-phone or PC from a relative or care taker and/or to other reporting devices (e.g. mobile phone audio, buzzers, illuminate signs, etc.).

While the prior art already provides similar systems, an example being shown in FIG. 1, the prior art solutions seem to have some disadvantages. For example, it appears to be difficult to configure and/or reconfigure the system, meaning in particular the manner of how the system is made aware that certain sensor devices belong to a particular data collecting device (and not to that of the neighbors), and how the system is made aware of where the sensor is physically located (e.g. in the kitchen or bathroom, etc.). For example, in some prior art systems, each device has an identifier printed on a sticker, and the system-setup involves manually logging in on a web-site, and inputting for each device a long series of digits printed on said sticker. This is a very error-prone process, because typically these sequences are quite long, and involve a relatively large number of letters and/or digits. Moreover, the letters and/or numbers are often difficult to read due to small print, and there is often confusion between letter 'O' and 'Q' and number zero, or between letter 'G' and number 6, letter 'g' and number '9', letter 'S' and number 5, letter 'I' (large i) or 'l' (small L) and number 1, just to name a few.

Another problem related to prior art systems is that also the interpretation of the data (e.g. mobility data) provided by such a system to a viewing device (e.g. a mobile phone of a relative or care taker) is not always easy to readily interpret, because the relative may have to mentally associate the sensor number (or ID) to a physical location in the building. In some applications of the present invention (e.g. a mobility monitoring system), the room or location type (e.g. bed room versus bath room versus TV room versus kitchen) is needed for meaningful interpretation of activities such as sleeping behavior, eating behavior or toilet usage. Some prior art solutions solve the latter problem by associating a text-string to each sensor, for example "bed room" to sensor 2, which again complicates the configuration, and may have a severe impact on the way in which the data can be reported on the viewing device, especially on a small screen with a limited number of dots, and on the semantic level of the data which can be shown (e.g. sleep analysis requires a properly identified bedroom sensor).

Confronted with these problems, the inventors of the present invention came to the idea of:

(1) associating each movement sensor (further referred to as "wireless signaling device") with a particular room or rather "room-type", although "location-type" would be an even better name, because in embodiments of the present invention, some of the wireless signaling devices may also be arranged outside the building, e.g. in the garden or parking space), (2) associating each "room-type" with a particular color (e.g. dark blue=bathroom, light green=garden, pink=bedroom), whereby the association of a particular color to a particular room type can be chosen to be highly intuitive, and thus easy to interpret and easy to remember, (3) providing a way to make the color associated with a particular signaling device adjustable, (4) to use the same color throughout the system, from the signaling device, through the analysis software, to the viewing device.

More specifically, they came up with the ideas of:

storing the room-type in the wireless sensor device itself (rather than making this association on some web-page where the user has to input the unique identifier), and to provide a push-button and a multi-color light source on the wireless signaling device itself, to allow the device to show its color (in an energy efficient manner) when the user or a technician pushes the button, e.g. at installation time, or during a service call, and to include the room-type (or the color associated with that room-type) in messages sent by that device.

These are the main underlying ideas of the present invention, and based on these ideas, the problems mentioned above can be solved in an elegant way. Indeed, the "configuration" can now be performed by "choosing a color" on the device itself, rather than typing long strings or characters on a web-interface, and the "analysis results" associated to particular rooms (for example "sleep behavior" or "eating behavior") can be displayed using the respective colors of for example the bedroom and the kitchen, so that an intuitive association between the analysis results and the room where each signaling device is located, is made, which facilitates interpretation of the results.

Referring now to the Figures.

Figure 2:
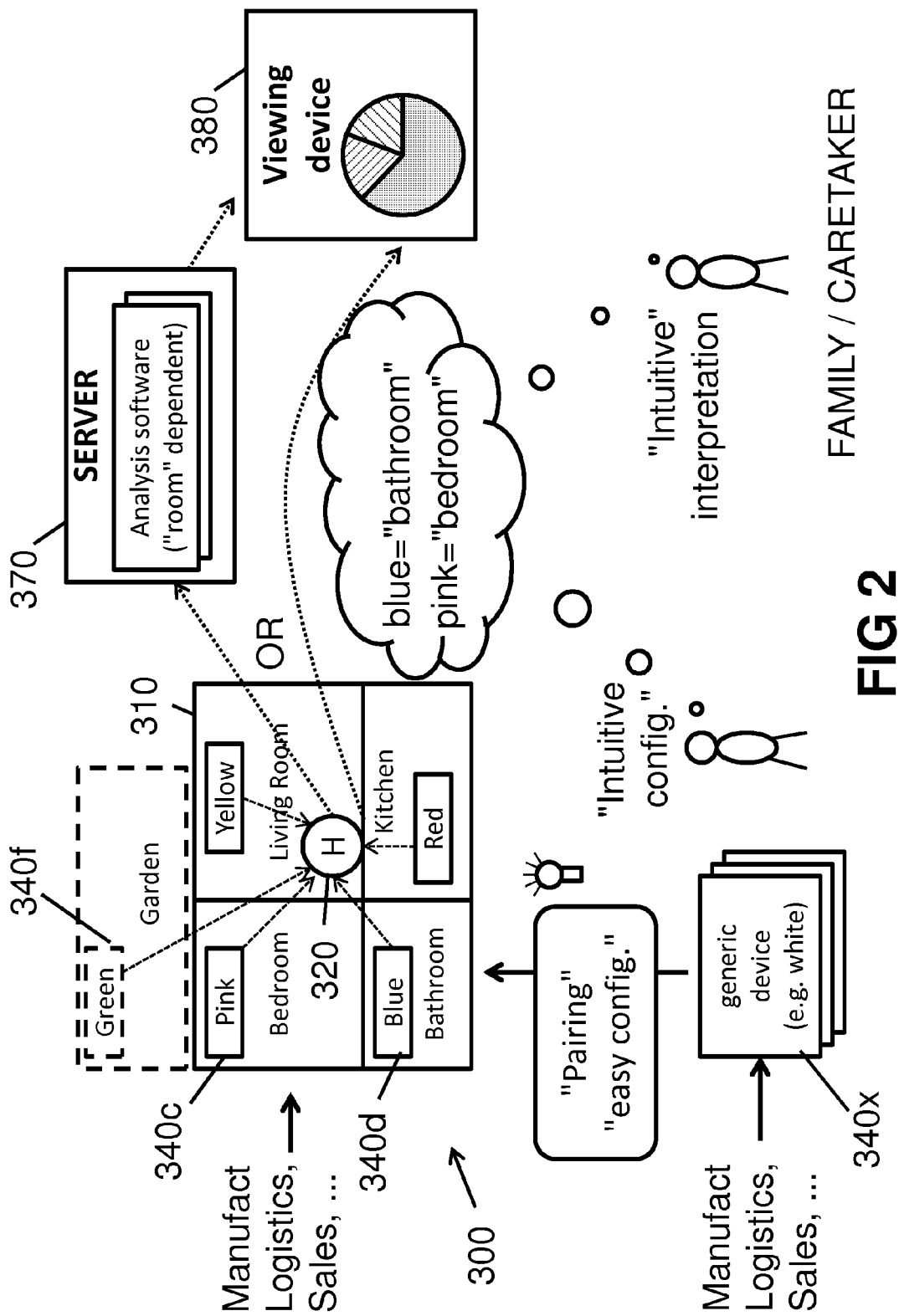
FIG. 2 shows an overview of important aspects of a system according to the present invention, and its main advantages.

FIG. 1 is based on FIG. 2 of EP2472487A2 and shows a schematic diagram of a system 100 for monitoring a person living in a home-like residential facility. It shows a wireless sensor network having multiple wireless sensors, and an aggregator that collects the data of the sensors and forwards the data to a cloud-based server. The server performs analysis of the data, and sends reports to viewing devices.

FIG. 2 shows an example of a system 300 according to the present invention, and its main advantages.

It shows (left top) a building having several locations, e.g. a bathroom, a kitchen, a bedroom, a living room, and a garden. A wireless sensor system 300 is located in this building. The sensor system comprises a data collecting device 320 (also sometimes referred to herein as "hub" or "gateway" when connected to a remote server, although that is not absolutely necessary), which has an RF receiver for receiving messages from a plurality of wireless signaling devices 340. Each of the wireless signaling devices 340 of FIG. 2 has a movement sensor for detecting movements in a respective location (e.g. bedroom or garden), and has an RF transmitter for signaling such movement events to the data collecting device 320, as suggested by the arrows.

During normal operation, the wireless signaling devices 340 detect movements when the person is moving inside a room, or moves from one room to another, and sends one or more data packets to the data collecting device 320 to signal such movements. The data collecting device 320 may time-stamp the data packets before storing them in a memory (e.g. in a file or database) and/or before transmitting them to a server 370 for further analysis. The data collecting device 320 and/or the server 370 may comprise analysis software for analyzing the data, for example by calculating "mobility parameters", or "sleep parameters", or the like. Analysis software per se is known in the art, and is not the main focus of the present invention. The server then transmits results of the analysis (e.g. one or more mobility values or sleep values) to one or more viewing devices 380, where the results are shown on a color display. In an alternative embodiment, the data collecting device 320 performs the analysis itself and sends the results to the viewing devices itself, in which case the server 370 can be omitted (as suggested by the dotted lines).

According to an important aspect of the present invention, each wireless signaling device has an adjustable room-type value which can be preset during production or can be set or changed during configuration, and an associated color, for example "blue" for the wireless signaling device to be located in the bathroom, "red" for the wireless signaling device to be located in the kitchen, etc. By providing an adjustable room-type (and color), it is possible to produce generic devices (e.g. having a dummy room-type value, also referred to herein as "white devices"), which is advantageous for manufacturing, logistics, after sales, etc. (see FIG. 2 left bottom). For example, if a user already has a system with five wireless signaling devices (see FIG. 2 left top), and wants to install a sixth device in the toilet (for example), he/she can simply order a generic device, and "configure" or later "reconfigure" the room-type him/her-self, as will be explained further. The wireless signaling device 340 also needs to be "paired" with the data collection device 320, to make sure the data collection device includes the unique identifier of the new wireless signaling device 340 in its internal list. Actually, all of the wireless signaling devices 340 of the system shown in FIG. 2 (top left) could be sold as generic devices, and the user could configure him/her-self all these devices. Alternatively, a set of for example four pre-configured devices could be sold as a package (for example having four signaling devices pre-configured as "blue", "pink", "yellow" and "red"), or any other set of predefined colors, but even then, the end-user can reconfigure the color of one or more of them (see FIG. 2 left).

The wireless signaling devices also have a push-button and a multi-color light source, e.g. an RGB-LED. When the button is pressed, a light with the color corresponding to the room-type, is shown. In this way, the device can show it is a "red device" belonging in the kitchen, or a "blue device" belonging in the bathroom, without having to show the light all the time (to save energy). Of course a device with a red colored housing could have been used, but such a color is not adjustable, which would mean that devices with different colored housings would have to be produced and sold, which is much more difficult from a logistics point of view.

The signaling devices 340 transmit data packets to the data collecting device 320 to signal movement events, and the devices include a value related to the room-type, e.g. the value of the room-type itself, or the corresponding color value, or a derivative thereof. The data collecting device 320 may time-stamp the data packets and transfer them (e.g. as a file) to a server 370. The analysis software, or at least some parts thereof, performed on a processing unit of the data collecting device itself or of the server may take into account the room-type of the data packets. For example eating habits are related to the sensor located in the kitchen, and sleeping habits are mainly related to data packets sent by the signaling device 340 located in the bedroom (also referred to as the "pink" signaling device). By incorporating the room-type in the data-packets, the analysis software need not consider the unique identifier of each device (also included in the data packets), and look-up in some table in which room that particular device is located, but immediately knows for each data packet to which room-type it belongs. This may largely simplify the analysis of the data. The analysis software may calculate for example a number of "mobility values", for example a first mobility value that represents the average time required to move from the kitchen to the bedroom, or a second mobility value that represents the average time required to move from the bathroom to the living room. In an embodiment of the present invention, twelve such mobility values are calculated, but another number could also be used. The average may be taken over a day, a week, a month, or over a longer period of time, for example multiple years. In this way, mobility variations of the person can be measured.

The mobility values may be represented in a bi-color graph, having a first color (e.g. blue) corresponding to the first room (e.g. bathroom) and a second color (e.g. yellow) corresponding to the second room (e.g. living room), to indicate that the graph represents a mobility value related to movements from the bathroom to the living room. This is immediately recognizable and intuitively self-explaining by merely looking at the colors. It also helps during technical support calls to check proper installation of the system by asking users simple questions such as for example "please press the button located in the living room sensor and tell us the color being displayed".

As another example, a pie chart may be shown representing the average time spent in each room, and/or variations thereof over time. By showing each pie segment in the correct color (i.e. the same color as was used during configuration, and is shown each time the user presses the button), for example the blue pie segment representing the time spent in the bathroom, and the pink pie segment representing the time spent in the bedroom, the results being shown are immediately recognizable, and can be interpreted easily and intuitively, for example by a family member or care taker.

Thus, the link between the room-type and the color acts as a common thread throughout the system of the present invention.

Figure 3:
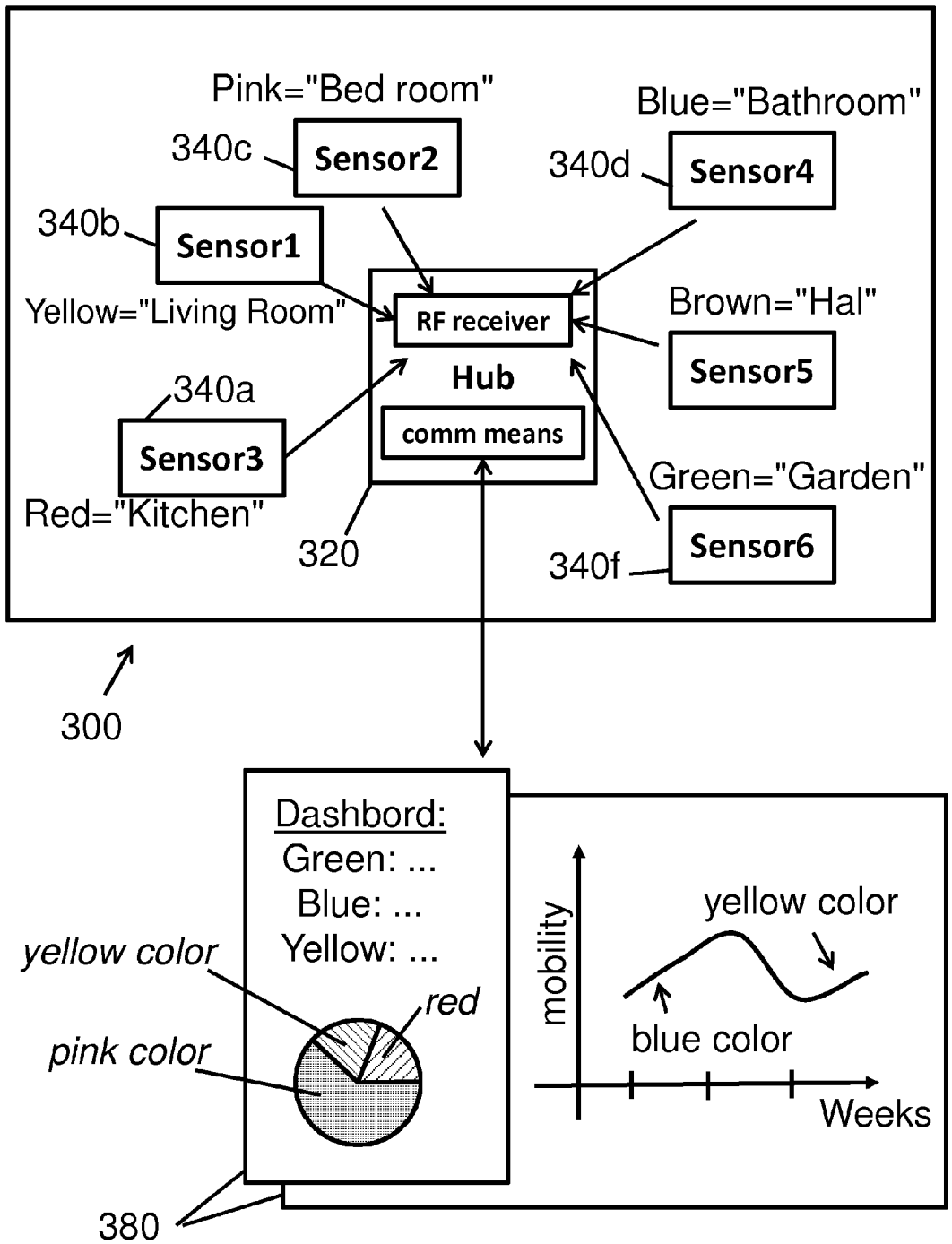
FIG. 3 is a conceptual view to illustrate how a holder of a viewing device (e.g. mobile device) would intuitively link the data provided by the system of FIG. 2 on a viewing device with the physical sensors in the building.

FIG. 3 (bottom) shows examples of how analysis data may be shown on a viewing device 380. On the left a screen with a colored pie chart is shown, on the right a multi-color (e.g. bi-color) curve is shown. The upper half of FIG. 3 shows an example of the intuitive associations made by a typical holder of the viewing device 380, when interpreting the data shown in FIG. 3.

Figure 4:
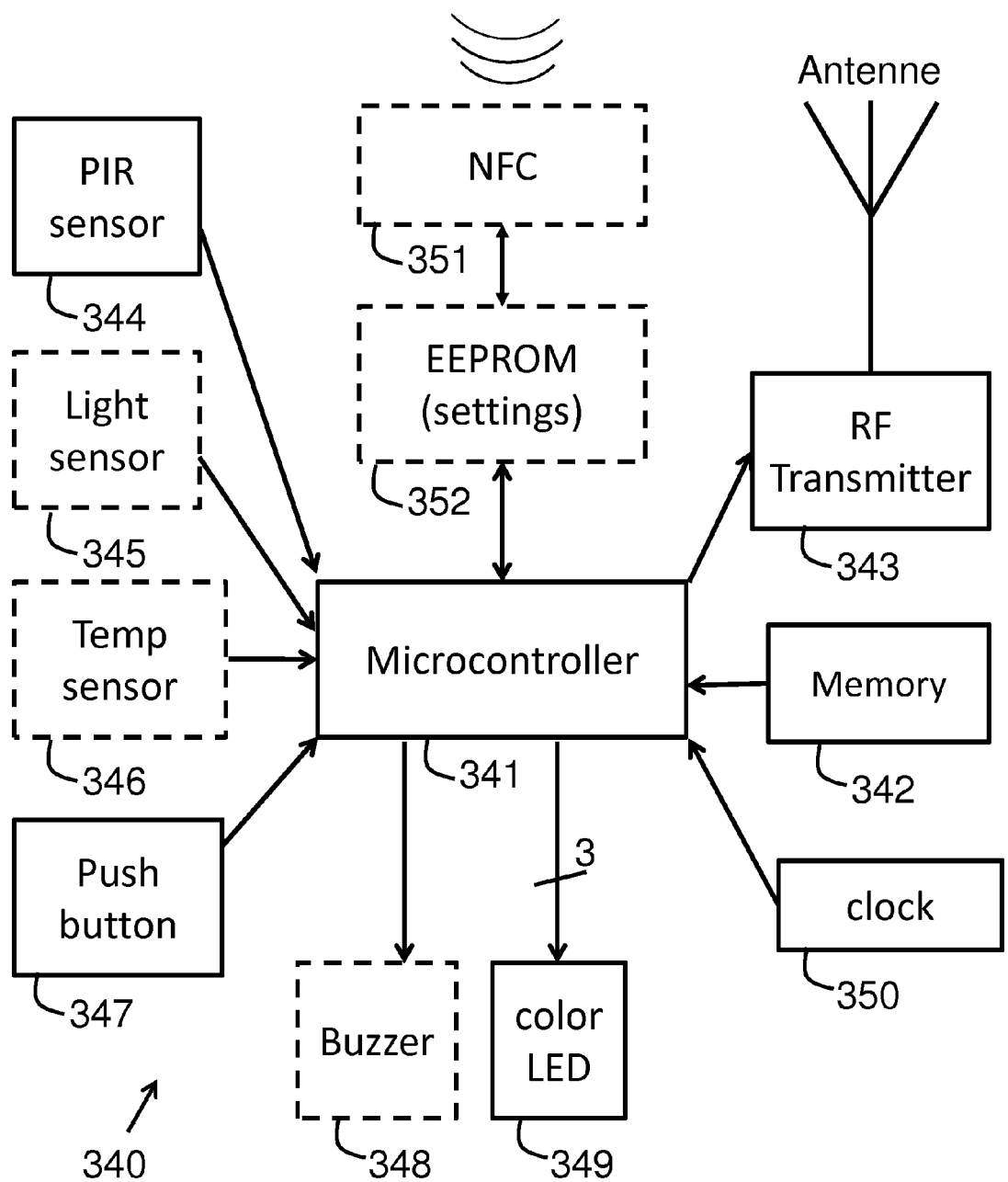
FIG. 4 shows an exemplary block-diagram of a wireless signaling device as can be used in the system of FIG. 2.

FIG. 4 shows a block-diagram of an exemplary wireless signaling device 340 as can be used in the system 300 of FIG. 2. It comprises a programmable microcontroller 341, which executes instructions stored in a non-volatile memory 342, e.g. a flash device. The microcontroller is connected to a clock, e.g. an RC oscillator based clock 350, which generates a clock signal that can be used for example when sending messages at a specific baudrate to an RF transmitter 343 comprised in the device 340. The RF transmitter 343 may be part of a transceiver, but that is not absolutely required for the present invention, because the system 300 will also work with unidirectional signaling from the signaling devices 340 to the data collecting device 320. The wireless signaling device 340 further comprises a movement sensor 344, e.g. a passive infrared (PIR) sensor for detecting movement events, and a push button 347 for allowing input from the user (for example to report an alarm situation, or during configuration to adjust the room-type and/or associated color). The device 340 may further optionally comprise a temperature sensor 346 for sensing a temperature in the room, and may optionally comprise a light sensor 345 for measuring a light intensity in the room, or at least for detecting whether or not it is dark in the room. The device 340 further comprises a multi-color light source 349, e.g. an RGB LED, to show a color corresponding to the selected room-type, when the user pushes the button 347.

Although shown as separate blocks, one or more of the components shown in FIG. 4 may be embedded in the microprocessor, for example the program memory (e.g. flash), and the RC clock. Of course, the microprocessor may also have other functional blocks (not shown), such as internal RAM, PWM generator blocks, an ADC converter for measuring a light signal, an ADC converter for measuring the temperature, an ADC converter for measuring a battery voltage (not shown), etc.

There are several ways in which the adjustable room-type can be stored in the device 340. For example, the room-type may be set by a number of dip-switches (not shown). In the example of FIG. 4, the adjustable room-type is stored as a number of bits, e.g. as six bits, in a dual-port EEPROM 352. The EEPROM may be part of a Near-Field-Communication (NFC) module 351. An RFID interface allows to change certain settings in an EEPROM to be written with near-field communication (NFC). During configuration, the adjustable room-type (and optionally other settings) can be written in the EEPROM in a contact-less manner, e.g. by holding a mobile phone with an NFC writer close to the device, and by running a suitable app which allows the user to select a particular room-type, and which writes the selected room-type in the EEPROM. After the configuration, the user would push the button 340, and the microcontroller would read the selected room-type (and optionally other data) from the EEPROM 352, and would drive the color LED 349 using a color corresponding to the value of the room-type stored in the EEPROM, for example by using three PWM-signals representing color components Red, Green, Blue. The color may be determined using a color lookup-table (CLUT) stored in the EEPROM, or stored in the memory 342, or may be derived directly from the value of the room-type itself, for example by considering the bits of the room-type as the most-significant bits of the red, green and blue color value. This explains how the room-type and thus the "color of the device" is configurable, and is easy to perform by a non-technical person. (e.g. by running an app on a smart-phone).

Figure 7:
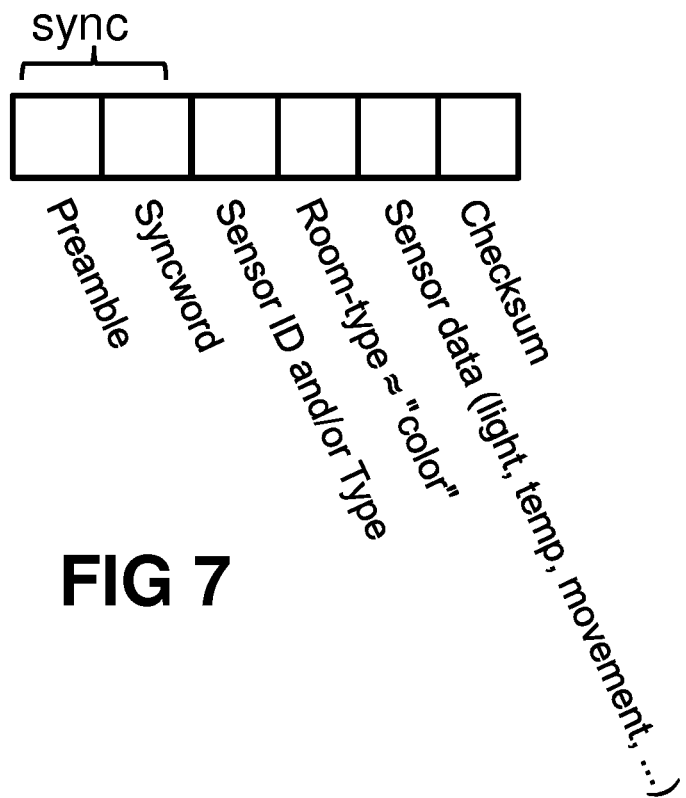
FIG. 7 shows an exemplary data packet format for communication from the wireless signaling devices to the data collecting device, as can be used in embodiments of the present invention.

During normal operation, when a movement event is detected by the PIR sensor 344, the microcontroller 341 will prepare a data packet, and send it to the data collecting device 320 using the RF transmitter (see also FIG. 7). This data packet may also contain a light intensity value and/or a temperature value. The signaling device 340 may optionally also comprise a buzzer 348 to provide audible feedback to the user, for example when the user pressed the button to signal an alarm situation. Finally, the signaling device 340 may be battery powered, and the microcontroller may be also adapted to read a state of the battery (e.g. a value related to the voltage), and this value could also be included in messages sent to the data collecting device.

Figure 5:
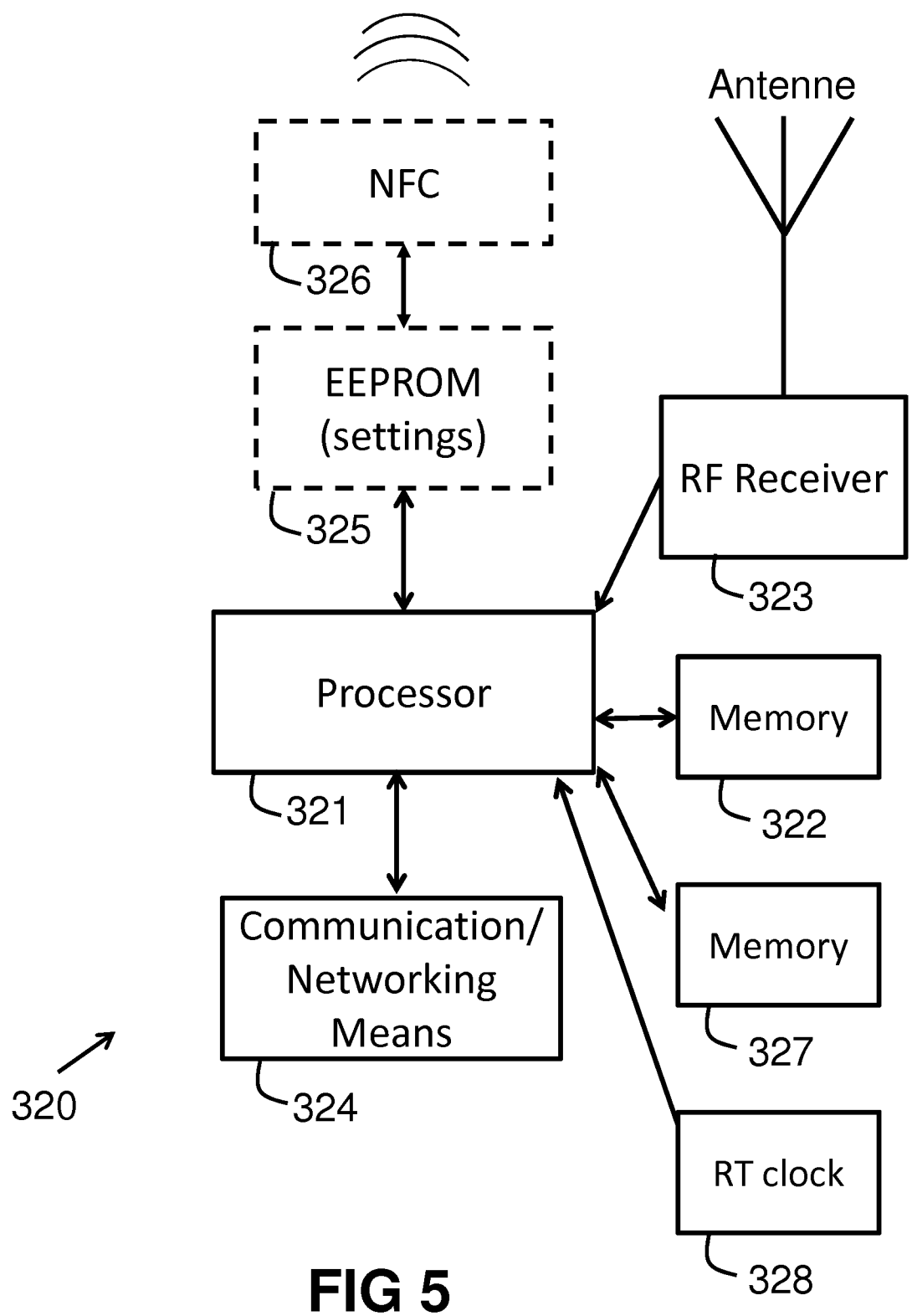
FIG. 5 shows an exemplary block-diagram of a data collecting device as can be used in the system of FIG. 2.

FIG. 5 shows a block-diagram of an exemplary data collecting device 320 as can be used in the system of FIG. 2. It contains a programmable processor 321, connected to a non-volatile memory 322 containing program code for the processor to execute. The device 320 further comprises an RF receiver 323 for receiving data packets from the signaling devices 340. The RF receiver may be part of a transceiver, but that is not absolutely required. The device 320 further comprises a memory 327, e.g. RAM or flash for at least temporarily storing received data packets received from the signaling devices 340 via the RF receiver. The processor 321 may be adapted for time-stamping the data packets before storing them in the memory 327, using a value obtained from a real-time clock 328 included in the device 320.

The data collecting device may also be connectable to, or comprise a wired or wireless communication or networking means 324, for communicating to a server 370 (see FIG. 2), or for communicating directly to viewing devices. The communication means 324 may comprise wireless communication means such as e.g. WiFi, GPRS, GSM, UMTS or EDGE communication, etc, or wired communication means such as e.g. ethernet, ADSL, etc., or combinations hereof, but other wired or wireless communication or networking means may also be used.

The data collecting device 320 may also include an RFID module having an EEPROM for storing settings, e.g. settings related to the RF receiver 323. The settings of the data collecting device (for example related to the RF communication) may be stored for example in an EEPROM. These settings are typically initialized during production, and may be updated for example via commands from a remote server. The server may also update the software of the data collecting device, or parts thereof (in manners known per se in the art). In case the data collecting device has a USB-port, new settings and/or software updates may be read by the processor 321 from a USB-memory device.

The data collecting device 320 may also include an NFC writer, which can be used to power and program the EEPROM 352 of the wireless signaling devices 340 during configuration thereof, in which case an external smartphone with NFC functionality (described above) is not required.

In some embodiments, the processor 321 may be adapted for executing the analysis program discussed above itself (in relation to FIG. 2), in which case the server 370 can be omitted from the system, and in which case the data collecting device 320 would not only collect the data, and time-stamp it, but also analyze the data, and send resulting data, e.g. one or more mobility values to the one or more viewing devices 380, via the communication means 324, which may for example be a GPRS module.

Figure 6:
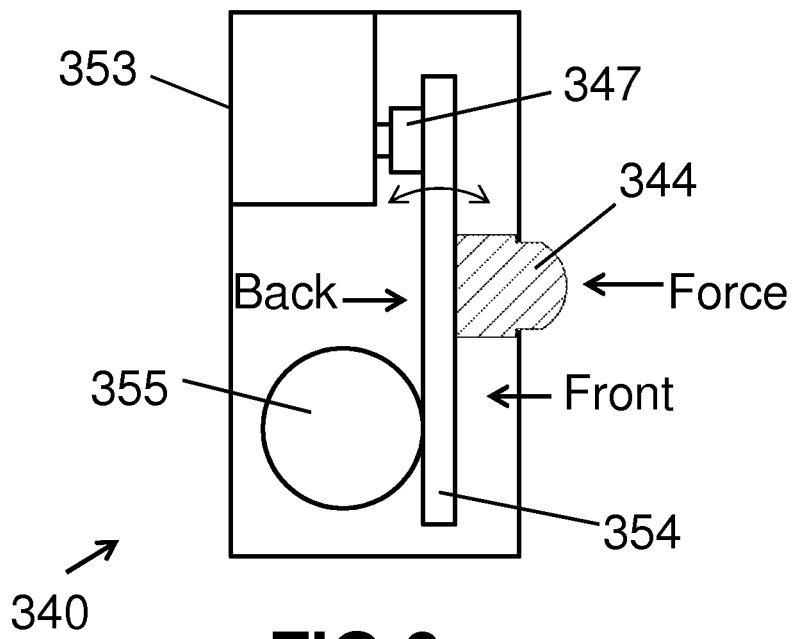
FIG. 6 illustrates a particular mounting technique which can be used in embodiments of the wireless signaling devices according to the present invention.

Referring to FIG. 6, the wireless signaling device 340 is typically contained in a housing 353. In preferred embodiments, the housing is closed, in a manner so that it cannot be opened by the end-user without damaging the device. In this way the risk of water ingress can be reduced or eliminated.

The device 340 shown in FIG. 6 comprises a PCB 354 containing at least some, preferably all of the components described in relation to FIG. 4. The PCB may be mounted in a manner such that the PCB can rotate relative to the (longitudinal) battery 355 (having a circular cross section), as illustrated in FIG. 6. The movement sensor, e.g. a PIR sensor 344 comprising a Fresnel lens may be mounted on the front side of the PCB, and may be partially extending through the housing 353 allowing the user to touch it. The push-button 347 may be mounted on the back side of the PCB, such that it abuts a part of the housing. The push button may comprise a spring or other resilient element (not shown). When the user touches the movement sensor 344 (or the part thereof that extends from the housing) and exerts a force against the movement sensor 344, the PCB is slightly rotated relative to the housing 353, which causes the push button 347 to be pressed, which in turn will generate a signal to the micro processor 341 (see FIG. 4). When the user removes the force, the spring of the push button pushes back the PCB, and the button 347 is released. As can be seen, the diameter of the movement sensor 344, e.g. a PIR sensor is typically much larger than the diameter of the movable button part of the push button 347. It is an advantage of this mounting technique that it is much easier for an end-user to push on the (relatively large) movement sensor 344, than it would be to push the (relatively small) movable part of the push button, if this were mounted on the front side of the PCB, especially for elderly people. Also, in this way, any mechanical adaptor elements can be avoided, thus reducing the assembly cost of the device 340. Although preferred, this mounting technique is not mandatory for the present invention, and the invention will also work with other mounting techniques. The housing is preferably made of a plastic material which allows passage of the light generated by the multi-color LED, but preferably diffuses this light so that a combined color is displayed. In this way it can be avoided that a user could distinguish three small bright dots, but instead sees a single color light. Of course, multiple RGB-LEDs showing the same color may also be used.

FIG. 7 shows an exemplary data packet format, as can be used in embodiments of wireless signaling devices according to the present invention. The data packet shown in FIG. 7 contains a preamble, e.g. a bit-synchronization pattern with alternating zero-bits '0' and one-bits '1'. The data packet may further comprise a sync-word. This allows the RF receiver 323 to align at byte-level or at word-level with the RF-transmitter 343. The data packet may further comprise a unique ID, allowing each wireless signaling device to be uniquely identified. The data packet may further comprise a Type value, for example a hardware version and/or software version. This may be relevant for service purposes. Importantly, the data packet contains a value related to the room-type, for example the room-type value itself, or a value related to the corresponding color.

In a preferred embodiment, this value may be a byte value, the upper two bits being '00', the lower six bits representing a number in the range of 0 to 63 representing the room-type. In a preferred embodiment, these 6 bits at the same time represent 2+2+2 most significant bits of a Red, Green and Blue color component of the color associated with that particular room-type.

The data packet may further comprise payload data, for example information related to a light intensity (obtained from the light sensor 345), and/or information related to a temperature (obtained from the temperature sensor 346), and/or information related to a battery status, and/or information related to one or more movements (obtained from the PIR sensor 344). Finally, the data packet may contain a checksum, for example a CRC (cyclic redundancy check value), to allow the data collecting device 320 to verify whether a data packet is received correctly, or whether the data is corrupt, e.g. due to packet collisions when two wireless signaling devices 340 are transmitting at the same time.

Although the invention has been described with reference to particular embodiments, many variants are possible. For example, any suitable type of RF transmitter and RF receiver can be used (for example: based on ZigBee, or any proprietary system working in the ISM band). Although not essential for the present invention, the messages sent from the data collecting device 320 to the server 370, and/or the messages sent by the data collecting device or the server to the viewing devices may be encrypted for privacy reasons. The latter communication may be based on any suitable technology, for example GPRS or UMTS. The server 370 shown in FIG. 2 may be a cloud based computer. The eeprom on the NFC circuit may have an I2C interface to the micro-controller.

The following aspects are also considered:

The system of the present invention may for example be used by an old couple, where the wife leaves the house, and monitors her husband with Alzheimer disease.

In embodiments of the present invention where mobility is measured, the sensors may preferably be arranged near an entrance of a room, e.g. near or at a door.

In embodiments of the present invention where the data collecting device is connected to a remote server, the data collecting device may be configured or reconfigured by the server, or its software, or part of its software may be updated via the server.

In embodiments of the present invention where the data collecting device is connected to a remote server, the data collecting device may be configured for temporarily storing messages in a non-volatile memory (e.g. EEPROM or flash, e.g. the EEPROM of the RFID-module, if present), when communication with the server is not possible. In this way, the risk of loosing messages can be further reduced, even when the server is not "on-line".

In embodiments of the present invention, the data collecting device may further comprise a USB-port, where for example a USB memory-stick can be inserted by the user, and the data collecting device may use this memory for temporarily or permanently storing messages. This is especially useful in embodiments where no server is used for processing the data, but where the data collecting device processes the data by itself. Storing and processing the data locally (and not on a server) offers an increased privacy.

Embodiments of the present invention not only allow a user to select for each sensor, a particular color from a set of predefined colors, but the color can also be changed, e.g. by near field communication. The association with the room-type (e.g. "green=garden") can be predefined (thus the same for all users), or can be configurable, e.g. on the server. The latter allows that different people use different colors, which are more intuitive for them (for example "yellow=kitchen" in a first building, where the kitchen furniture is mainly yellow, but "brown"=kitchen in a second building where the kitchen furniture is mainly brown). This is only one example of an intuitive association, but other intuitive associations can be made for each particular building, e.g. depending on particular characteristics thereof.—In embodiments of the present invention, the signaling device may also have means for sensing audio (e.g. a microphone), and/or means for measuring CO concentration and/or CO2 concentration, and/or means for measuring moisture level, and the micro-controller may be adapted to read these means, and to convert the data into digital values (e.g. by means of one or more ADC converter), and to include one or more of these values in at least some of the messages sent by the signaling device to the data collecting device.

The invention claimed is:

1. A system suitable for monitoring a person moving in a building comprising a plurality of rooms, the system comprising:
   a wireless sensor system for detecting and collecting movements of the person in at least some of the plurality of rooms, the wireless system comprising a computing device and one or more wireless signaling devices,
   the computing device comprising a data collecting device, wherein the data collecting device comprising an RF receiver for receiving movement related data from each of the plurality of wireless signaling devices, and a programmable controller connected to a memory, the controller being adapted for storing the received data at least temporarily in the memory, and a transceiver for transmitting processed movement related data;
   the one or more wireless signaling device comprising at least one movement sensor for detecting movement events in a particular room of at least some of the plurality of rooms, a programmable micro-controller and an RF transmitter for processing and transmitting such movement events to the data collecting device;

the computing device further comprising analysis software in a network server or in the programmable controller, for analyzing the detected movement events and for determining at least a present location value indicative of the particular room where the person being monitored is currently present, the computing device being connectable to the transceiver for sending the present location value to at least one viewing device comprising a color display and a viewing application for showing the present location corresponding to the present location value;

wherein:

the one or more wireless signaling device further comprises an adjustable room-type setting corresponding to a type of room where the wireless signaling device is to be located, and a multi-color light source, and a push-button, the micro-controller being adapted to, when the push-button is pressed, drive the multi-color light source to show light of a particular color based on the room-type defined by the room-type setting and based on a predefined color scheme;

the micro-controller being further adapted for sending at least one data packet after detection of a movement event by the at least one movement sensor, the data packet comprising room-type data corresponding to the room-type setting, and the analysis software is adapted for analyzing the movement events taking into account the room-type data;

the viewing application being adapted for displaying the present location by using at least one color object having a color based on said room-type setting and based on the predefined color scheme.

2. The system according to claim 1, wherein the multi-color light source is an RGB-LED.

3. The system according to claim 1, wherein a value of the adjustable room-type setting is defined by a plurality of dip-switches.

4. The system according to claim 1,
wherein a value of the adjustable room-type setting is defined by a plurality of bits in a non-volatile memory, and
wherein the micro-controller of the wireless signaling device is adapted for reading said non-volatile memory when the button is pressed and for driving the multi-color light source to show the particular color based on said value and based on the predefined color scheme.

5. The system according to claim 4, wherein the wireless signaling device further comprises an NFC circuit configured for writing said non-volatile memory using an external NFC writer, and wherein the micro-controller of the wireless signaling device is adapted for reading said non-volatile memory when the button is pressed and/or held down for a predetermined time-period.

6. The system according to claim 4, wherein the micro-controller is further adapted for testing whether the button is pressed and released according to a predefined pattern, and if the outcome of the test is true, to adjust the value of the room-type in the non-volatile memory, and to store the adjusted value in the non-volatile memory.

7. The system according to claim 1, wherein the room-type value is represented by a predefined number of at least three bits, each representing a most-significant bit of a color component of the particular color corresponding to said room-type value.

8. The system according to claim 1, wherein the at least one movement sensor is at least one passive infrared (PIR) sensor.

9. The system according to claim 1, wherein the at least one movement sensor is a movement sensor selected from the group consisting of: an inductive movement sensor, a capacitive movement sensor, an acoustic based movement sensor, a vibration based movement sensor, or an EMI/EMC based movement sensor.

10. The wireless sensor system according to claim 1, wherein the data collecting device further comprises a real-time clock, and wherein receiving and storing the data packets by the data collecting device comprises:
obtaining a time value from said real-time clock when a data packet is received by the RF receiver, and
adding a time-stamp to at least some of the received data packets, based on the time value obtained from said real-time clock,
and storing the time stamped data packets in the memory.

11. The wireless sensor system according to claim 1, wherein each of the wireless signaling devices further comprises a unique identifier (ID) stored in a non-volatile memory to allow each of the wireless signaling devices to be differentiated, and wherein the data packets sent by each wireless signaling device further comprises said identifier, and wherein the data collecting device holds a list of unique identifiers corresponding to the particular data collecting device, and wherein the controller of the data collecting device has a filter function for ignoring data packets with identifiers not included in the list.

12. The wireless sensor system according to claim 1,
wherein the wireless signaling device further comprises a light sensor, and
wherein the micro-controller of the wireless signaling device is further adapted for reading a light intensity value from said light sensor and for including data corresponding to said light intensity value in some of the at least one data packet transmitted to the data collecting device.

13. The wireless sensor system according to claim 1,
wherein the wireless signaling device further comprises a temperature sensor, and
wherein the micro-controller of the wireless signaling device is adapted for reading a temperature value from said temperature sensor and for including data related to said temperature value in some of the at least one data packet transmitted to the data collecting device.

14. The wireless sensor system according to claim 1,
wherein the wireless signaling device further comprises a housing containing a printed circuit board (PCB) holding at least the micro-controller, the RF transmitter, the movement sensor and the button.

15. The wireless sensor system according to claim 14,
wherein the housing of the wireless signaling device comprises a non-replaceable battery, and wherein the housing is permanently closed.

16. The wireless sensor system according to claim 14, wherein the PCB is mounted in a pivotable manner, and wherein the movement sensor is mounted on a front side of the PCB and protrudes the housing, and wherein the button is mounted on a back side of the PCB facing a portion of the housing, and the wireless signaling device further comprises a spring arranged such that, when a force is exerted upon the movement sensor, the button is pressed, and when no force is exerted upon the movement sensor, the button is not pressed.

17. A mobility monitoring system for determining mobility and/or mobility changes of a person living in a residential facility, comprising a wireless sensor system comprising:
- a wireless sensor system for detecting and collecting movements of the person in at least some of the plurality of rooms, the wireless system comprising a computing device and one or more wireless signaling devices,
  - the computing device comprising a data collecting device comprising an RF receiver for receiving movement related data from each of the plurality of wireless signaling devices, and a programmable controller connected to a memory, the controller being adapted for storing the received data at least temporarily in the memory, and a transceiver for transmitting processed movement related data;
  - the one or more wireless signaling device comprising at least one movement sensor for detecting movement events in a particular room of at least some of the plurality of rooms, a programmable micro-controller and an RF transmitter for processing and transmitting such movement events to the data collecting device;
  - the network server comprises the computing device comprising the analysis software in the programmable controller, for analyzing the detected movement events and for determining at least a present location value indicative of the particular room where the person being monitored is currently present, the computing device being connectable to the transceiver for sending the present location value to at least one viewing device comprising a color display and a viewing application for showing the present location corresponding to the present location value;
  - the one or more wireless signaling device further comprising an adjustable room-type setting corresponding to a type of room where the wireless signaling device is to be located, and a multi-color light source, and a push-button,
  - the micro-controller being adapted to, when the push-button is pressed, drive the multi-color light source to show light of a particular color based on the room-type defined by the room-type setting and based on a pre-defined color scheme;
  - the micro-controller being further adapted for sending at least one data packet after detection of a movement event by the at least one movement sensor, the data packet comprising room-type data corresponding to the room-type setting, and
  - the analysis software is adapted for analyzing the movement events taking into account the room-type data;
  - the viewing application being adapted for displaying the present location by using at least one color object having a color based on said room-type setting and based on the predefined color scheme;
- wherein the analysis software is configured for calculating one or more mobility values based on a time difference between a last movement detected by a first wireless signaling device, and a first movement detected by a second wireless signaling device different from the first wireless signaling device.

18. The mobility monitoring system of claim 17,
  wherein the computing device comprises the analysis software in the programmable controller of the data collecting device, and
  wherein the data collection device further comprises a database for at least temporarily storing the collected data packets; and
  wherein the transceiver comprises a wired or wireless transceiver for communicating the present location information and/or the one or more mobility values to the at least one viewing device.

19. The mobility monitoring system of claim 17, further comprising a network server operatively connected to the data collecting device;
  wherein the data collecting device is further adapted to transfer at least a subset of the data packets received from the wireless signaling devices to the network server; and
  the network server further comprising a database for at least temporarily storing the data packets; and
  wherein the transceiver comprises a wired or wireless transceiver for communicating the present location information and/or the one or more mobility values to the at least one viewing device.

20. A wireless signaling device for use in a monitoring system comprising
  a wireless sensor system for detecting and collecting movements of the person in at least some of the plurality of rooms, the wireless system comprising a computing device and one or more wireless signaling devices,
    the computing device comprising a data collecting device comprising an RF receiver for receiving movement related data from each of the plurality of wireless signaling devices, and a programmable controller connected to a memory, the controller being adapted for storing the received data at least temporarily in the memory, and a transceiver for transmitting processed movement related data;
    the one or more wireless signaling device comprising at least one movement sensor for detecting movement events in a particular room of at least some of the plurality of rooms, a programmable micro-controller and an RF transmitter for processing and transmitting such movement events to the data collecting device;
    the computing device comprising analysis software in a network server or in the programmable controller, for analyzing the detected movement events and for determining at least a present location value indicative of the particular room where the person being monitored is currently present, the computing device being connectable to the transceiver for sending the present location value to at least one viewing device comprising a color display and a viewing application for showing the present location corresponding to the present location value;
    the analysis software being adapted for analyzing the movement events taking into account the room-type data;
    the viewing application being adapted for displaying the present location by using at least one color object having a color based on said room-type setting and based on the predefined color scheme;
  the wireless signaling device comprising:
    adjustable room-type-related setting corresponding to a type of room where the wireless signaling device is to be located;
    a multi-color light source, and a push-button,
    wherein:

the micro-controller is adapted to, when the button is pressed, drive the multi-color light source to show light of a particular color based on the room-type defined by the settings and based on a predefined color scheme; and the micro-controller of the wireless signaling device is further adapted for sending at least one data packet after detection of a movement event by its movement sensor, the data packet comprising data related to the room-type defined by the settings.

* * * * *